United States Patent
Ashida

(10) Patent No.: US 12,215,257 B2
(45) Date of Patent: Feb. 4, 2025

(54) COMPOSITION FOR SELF-SUCTION ADHERING FOAM SHEET AND SELF-SUCTION ADHERING FOAM LAMINATE SHEET

(71) Applicant: ZEON CORPORATION, Tokyo (JP)

(72) Inventor: Shinsuke Ashida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 587 days.

(21) Appl. No.: 17/593,212

(22) PCT Filed: Mar. 23, 2020

(86) PCT No.: PCT/JP2020/012727
§ 371 (c)(1),
(2) Date: Sep. 13, 2021

(87) PCT Pub. No.: WO2020/196406
PCT Pub. Date: Oct. 1, 2020

(65) Prior Publication Data
US 2022/0162483 A1    May 26, 2022

(30) Foreign Application Priority Data

Mar. 27, 2019 (JP) .................. 2019-061147

(51) Int. Cl.
*C09J 7/30* (2018.01)
*B32B 7/12* (2006.01)
(Continued)

(52) U.S. Cl.
CPC ............ *C09J 7/385* (2018.01); *B32B 7/12* (2013.01); *B32B 17/10* (2013.01); *B32B 27/36* (2013.01); *C09J 11/06* (2013.01); *C09J 2433/00* (2013.01)

(58) Field of Classification Search
CPC ........ C09J 7/385; C09J 11/06; C09J 2433/00; B32B 7/12; B32B 17/10; B32B 27/36
(Continued)

(56) References Cited

U.S. PATENT DOCUMENTS 11,427,691 B2 * 8/2022 Ashida .................. C08L 33/04
2016/0221299 A1   8/2016 Doi et al.
(Continued)

FOREIGN PATENT DOCUMENTS

EP    3450519 A1    3/2019
JP    2003001741 A  1/2003
(Continued)

OTHER PUBLICATIONS

Jun. 23, 2020, International Search Report issued in the International Patent Application No. PCT/JP2020/012727.
(Continued)

*Primary Examiner* — Betelhem Shewareged
(74) *Attorney, Agent, or Firm* — KENJA IP LAW PC

(57) ABSTRACT

Provided is a composition for a self-suction adhering foam sheet that can be used to obtain a self-suction adhering foam laminate sheet that has excellent air releasability while also inhibiting formation of resin residue on metal after weathering. The composition for a self-suction adhering foam sheet contains a polymer including an unsaturated carboxylic acid monomer unit in a proportion of not less than 0.1 mass % and not more than 20 mass %, a cross-linker, and 1.5 parts by mass or more of a higher fatty acid salt per 100 parts by mass of the polymer.

13 Claims, 2 Drawing Sheets

(51) Int. Cl.
  *B32B 17/10*  (2006.01)
  *B32B 27/36*  (2006.01)
  *C09J 7/38*   (2018.01)
  *C09J 11/06*  (2006.01)
(58) Field of Classification Search
  USPC ...................................................... 428/195.1
  See application file for complete search history.

(56) References Cited

U.S. PATENT DOCUMENTS

| | | | |
|---|---|---|---|
| 2016/0303822 A1 | 10/2016 | Kato et al. | |
| 2018/0056625 A1 | 3/2018 | Ashida et al. | |
| 2019/0367780 A1 | 12/2019 | Tanaka et al. | |
| 2022/0162483 A1* | 5/2022 | Ashida | B32B 15/09 |

FOREIGN PATENT DOCUMENTS

| | | |
|---|---|---|
| WO | 2016147679 A1 | 9/2016 |
| WO | 2016147680 A1 | 9/2016 |
| WO | 2018025568 A1 | 2/2018 |
| WO | 2018151274 A1 | 8/2018 |

OTHER PUBLICATIONS

Sep. 28, 2021, International Preliminary Report on Patentability issued in the International Patent Application No. PCT/JP2020/012727.

Nov. 8, 2022, the Extended European Search Report issued by the European Patent Office in the corresponding European Patent Application No. 20779053.6.

* cited by examiner

COMPOSITION FOR SELF-SUCTION ADHERING FOAM SHEET AND SELF-SUCTION ADHERING FOAM LAMINATE SHEET

TECHNICAL FIELD

The present disclosure relates to a composition for a self-suction adhering foam sheet and to a self-suction adhering foam laminate sheet.

BACKGROUND

In recent years, sheet-shaped members that are formed of foam materials including numerous fine pores and that display self-suction adhesion (i.e., self-suction adhering foam sheets (hereinafter, also referred to simply as "foam sheets")) have been used as adhesive sheets that are affixed to smooth adherends such as window glass for use. The mode of adhesion of a self-suction adhering foam sheet is through suction adhesion to an adherend using the fine pores thereof rather than through gluing. Consequently, self-suction adhering foam sheets are easy to reaffix compared to conventional adhesive sheets that utilize gluing, and are suitable for use in applications such as wallpaper, posters, and stickers, for example. In these applications, a self-suction adhering foam sheet is typically used in the form of a self-suction adhering foam laminate sheet (hereinafter, also referred to simply as a "laminate sheet") in which the self-suction adhering foam sheet is stacked with a substrate. Decorating the surface at the substrate-side of the self-suction adhering foam laminate sheet by printing or the like enables advantageous use of the self-suction adhering foam laminate sheet in applications such as described above.

Improvements have been made to compositions used in production of constituent foam sheets of self-suction adhering foam laminate sheets in order to increase performance of such laminate sheets. (Note that hereinafter, such a composition may also be referred to as a "composition for a self-suction adhering foam sheet" or simply as a "composition for a foam sheet".)

For example, self-suction adhering foam laminate sheets have frequently been used outdoors in recent years. For this reason, there has been demand for self-suction adhering foam laminate sheets to inhibit part of a foam sheet formed of resin remaining at the surface of an adherend when the self-suction adhering foam laminate sheet is peeled from the adherend, even after exposure to sunlight and/or rain over a long period (i.e., to inhibit formation of resin residue on an adherend after weathering).

In response to this problem, Patent Literature (PTL) 1 proposes a composition for a foam sheet that contains a polymer having specific properties and a cross-linker. Through a laminate sheet including a foam sheet that is formed from the composition for a foam sheet of PTL 1, it is possible to inhibit formation of resin residue on glass serving as an adherend, even after weathering.

CITATION LIST

Patent Literature

PTL 1: WO2018/151274A1

SUMMARY

Technical Problem

However, diversification of applications of laminate sheets in recent years has led to increased opportunities for use not only through being affixed to glass, but also through being affixed to metal. Moreover, studies carried out by the inventor have revealed that although a laminate sheet obtained by the conventional technique described above can inhibit formation of resin residue on glass after weathering, there is still room for improvement in terms of sufficiently inhibiting formation of resin residue on metal (particularly stainless steel (SUS)) after weathering.

It is also desirable for a laminate sheet to have an attribute of easily allowing removal of air pockets remaining between a foam sheet and an adherend when a surface at the foam sheet-side of the laminate sheet is suction adhered to an adherend (i.e., it is desirable for a laminate sheet to have excellent air releasability). This air releasability has also been the subject of demand for further improvement.

Accordingly, an object of the present disclosure is to provide a self-suction adhering foam laminate sheet that has excellent air releasability while also inhibiting formation of resin residue on metal after weathering and also to provide a composition for a self-suction adhering foam sheet that can be used to obtain this self-suction adhering foam laminate sheet.

Solution to Problem

The inventor conducted diligent investigation with the aim of solving the problems set forth above. The inventor discovered that by forming a foam sheet using a composition for a foam sheet that contains a specific polymer, a cross-linker, and not less than a specific amount of a higher fatty acid salt, it is possible to increase air releasability of a laminate sheet that includes the foam sheet while also inhibiting formation of resin residue on metal after weathering. In this manner, the inventor completed the present disclosure.

Specifically, the present disclosure aims to advantageously solve the problems set forth above, and a presently disclosed composition for a self-suction adhering foam sheet comprises: a polymer including an unsaturated carboxylic acid monomer unit in a proportion of not less than 0.1 mass % and not more than 20 mass %; a cross-linker; and 1.5 parts by mass or more of a higher fatty acid salt per 100 parts by mass of the polymer. By forming a foam sheet using a composition for a foam sheet that contains a polymer including an unsaturated carboxylic acid monomer unit in the specific proportion set forth above, a cross-linker, and a higher fatty acid salt and in which the amount of the higher fatty acid salt relative to the polymer is not less than the value set forth above in this manner, it is possible to cause a laminate sheet that includes the foam sheet to display excellent air releasability and also to inhibit formation of resin residue on metal even after the laminate sheet is exposed to sunlight and/or rain for a long period.

The phrase "includes a monomer unit" as used in the present disclosure means that "a polymer obtained with the monomer includes a structural unit derived from the monomer".

Moreover, the term "higher fatty acid salt" as used in the present disclosure refers to a salt formed of a higher fatty acid anion having a carbon number of 8 or more and a counter cation.

In the presently disclosed composition for a self-suction adhering foam sheet, the cross-linker is preferably a carbodiimide cross-linker. By using a composition for a foam sheet that contains a carbodiimide cross-linker as a cross-linker, it is possible to further inhibit formation of resin residue on metal after weathering of a laminate sheet.

In the presently disclosed composition for a self-suction adhering foam sheet, the polymer preferably further includes a (meth)acrylate monomer unit in a proportion of not less than 35 mass % and not more than 99 mass %. By using a composition for a foam sheet that contains a polymer including a (meth)acrylate monomer unit in the proportion set forth above, it is possible to obtain a laminate sheet that maintains good self-adhesive strength (close adhesion strength to an adherend) while also further inhibiting formation of resin residue on metal after weathering.

Note that in the present disclosure, "(meth)acrylate" is used to indicate "acrylate" and/or "methacrylate".

In the presently disclosed composition for a self-suction adhering foam sheet, the (meth)acrylate monomer unit preferably includes a (meth)acrylic acid alkyl ester monomer unit having an alkyl group carbon number of not less than 1 and not more than 14. By using a composition for a foam sheet that contains a polymer including a (meth)acrylic acid alkyl ester monomer unit having an alkyl group carbon number of not less than 1 and not more than 14 (hereinafter, also referred to simply as a "C1-14 (meth)acrylic acid alkyl ester monomer unit"), it is possible to improve self-adhesive strength of a laminate sheet.

Note that in the present disclosure, "(meth)acryl" is used to indicate "acryl" and/or "methacryl".

Also note that the "alkyl group carbon number" of a (meth)acrylic acid alkyl ester monomer unit referred to in the present disclosure is the number of carbon atoms in an alkyl group that is bonded to a non-carbonyl oxygen atom.

In the presently disclosed composition for a self-suction adhering foam sheet, the (meth)acrylate monomer unit preferably includes a (meth)acrylic acid alkyl ester monomer unit having an alkyl group carbon number of not less than 4 and not more than 14. By using a composition for a foam sheet that contains a polymer including a (meth)acrylic acid alkyl ester monomer unit having an alkyl group carbon number of not less than 4 and not more than 14 (hereinafter, also referred to simply as a "C4-14 (meth)acrylic acid alkyl ester monomer unit"), it is possible to further improve self-adhesive strength of a laminate sheet.

In the presently disclosed composition for a self-suction adhering foam sheet, the polymer preferably does not include an N-methylol group. By using a composition for a foam sheet containing a polymer that does not include an N-methylol group, it is possible to sufficiently inhibit the production of formaldehyde during foaming and curing of the composition for a foam sheet.

The presently disclosed composition for a self-suction adhering foam sheet preferably further comprises an amphoteric surfactant. By using a composition for a foam sheet that contains an amphoteric surfactant, self-adhesive strength of a laminate sheet does not excessively increase even after weathering, and the laminate sheet can be peeled from an adherend with sufficient ease. In addition, air releasability of the laminate sheet can be further improved.

In the presently disclosed composition for a self-suction adhering foam sheet, the higher fatty acid salt is preferably a stearic acid salt. By using a composition for a sheet that contains a stearic acid salt as a higher fatty acid salt, it is possible to further improve air releasability of an obtained laminate sheet.

Moreover, the present disclosure aims to advantageously solve the problems set forth above, and a presently disclosed self-suction adhering foam laminate sheet comprises: a substrate; and a self-suction adhering foam sheet formed using any one of the compositions for a self-suction adhering foam sheet set forth above. A laminate sheet that includes a foam sheet formed from the composition for a foam sheet set forth above on a substrate has excellent air releasability and inhibits formation of resin residue on metal even after exposure to sunlight and/or rain for a long period.

Advantageous Effect

According to the present disclosure, it is possible to provide a self-suction adhering foam laminate sheet that has excellent air releasability while also inhibiting formation of resin residue on metal after weathering and also to provide a composition for a self-suction adhering foam sheet that can be used to obtain this self-suction adhering foam laminate sheet.

DETAILED DESCRIPTION

Figure 1:
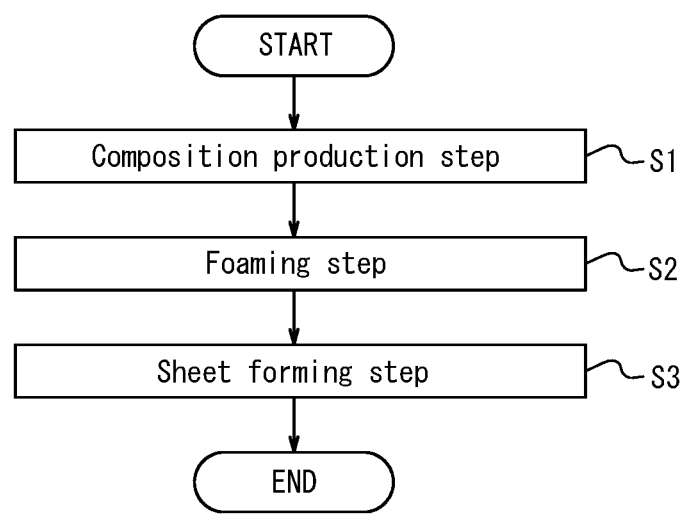
FIG. 1 is a flowchart for describing one example of a method of producing a self-suction adhering foam laminate sheet according to the present disclosure.

The following provides a detailed description of embodiments of the present disclosure.

The presently disclosed composition for a self-suction adhering foam sheet can suitably be used to obtain a self-suction adhering foam sheet that is a constituent element of the presently disclosed self-suction adhering foam laminate sheet. Moreover, the presently disclosed self-suction adhering foam laminate sheet includes a self-suction adhering foam sheet that is formed using the presently disclosed composition for a self-suction adhering foam sheet.

(Composition for Self-Suction Adhering Foam Sheet)

The presently disclosed composition for a foam sheet contains a polymer including an unsaturated carboxylic acid monomer unit in a proportion of not less than 0.1 mass % and not more than 20 mass %, a cross-linker, and a higher fatty acid salt, and optionally further contains a solvent and other additives. The amount of the higher fatty acid salt in the presently disclosed composition for a foam sheet is 1.5 parts by mass or more per 100 parts by mass of the polymer.

By using the presently disclosed composition for a foam sheet to form a foam sheet on a substrate, it is possible to obtain a laminate sheet that has excellent air releasability while also inhibiting formation of resin residue on metal after weathering.

<Polymer>

The polymer used in the presently disclosed composition for a foam sheet is a polymer that includes an unsaturated carboxylic acid monomer unit in a proportion of not less than 0.1 mass % and not more than 20 mass %. The polymer forms a resin matrix in an obtained foam sheet as result of foaming and cross-linking of the composition for a foam sheet.

<<Chemical Composition of Polymer>>

The polymer includes an unsaturated carboxylic acid monomer unit in the proportion set forth above and also includes one type or two or more types of monomer units other than the unsaturated carboxylic acid monomer unit. Preferable examples of such monomer units other than the unsaturated carboxylic acid monomer unit include a (meth) acrylate monomer unit and an alkenyl aromatic monomer unit. The polymer can also include monomer units other than the unsaturated carboxylic acid monomer unit, the (meth) acrylate monomer unit, and the alkenyl aromatic monomer unit (i.e., other monomer units).

[Unsaturated Carboxylic Acid Monomer Unit]

The unsaturated carboxylic acid monomer unit is a structural unit that is derived from an unsaturated carboxylic acid monomer.

Specific examples of unsaturated carboxylic acid monomers include α,β-ethylenically unsaturated monocarboxylic acids such as acrylic acid, methacrylic acid, and crotonic acid; α,β-ethylenically unsaturated polybasic carboxylic acids such as itaconic acid, maleic acid, and fumaric acid; and α,β-ethylenically unsaturated polybasic carboxylic acid partial esters such as monomethyl itaconate, monobutyl maleate, and monopropyl fumarate. Monomers including a group from which a carboxy group can be derived by hydrolysis or the like, such as maleic anhydride and itaconic anhydride, can also be used. Of these unsaturated carboxylic acid monomers, itaconic acid, acrylic acid, and methacrylic acid are preferable from a viewpoint of reactivity with the subsequently described cross-linker, stability of a polymer latex, and cost, with itaconic acid being more preferable.

Note that one unsaturated carboxylic acid monomer may be used individually, or two or more unsaturated carboxylic acid monomers may be used together.

The proportion constituted by the unsaturated carboxylic acid monomer unit in the polymer when all repeating units (all monomer units) included in the polymer are taken to be 100 mass % is required to be not less than 0.1 mass % and not more than 20 mass %, is preferably 0.5 mass % or more, more preferably 1 mass % or more, and even more preferably 1.5 mass % or more, and is preferably 10 mass % or less, more preferably 5 mass % or less, and even more preferably 2.5 mass % or less. When the proportion constituted by the unsaturated carboxylic acid monomer unit in the polymer is 0.1 mass % or more, a cross-linking reaction can be caused to sufficiently proceed through the subsequently described cross-linker. As a result, sufficient strength can be imparted to an obtained foam sheet while also inhibiting formation of resin residue on metal after weathering of a laminate sheet. On the other hand, when the proportion constituted by the unsaturated carboxylic acid monomer unit in the polymer is 20 mass % or less, it is easier to maintain the viscosity of a polymerization system within an appropriate range during polymerization, and self-adhesive strength of a laminate sheet is not lost due to excessive progression of cross-linking of the polymer.

[(Meth)Acrylate Monomer Unit]

The (meth)acrylate monomer unit is a structural unit that is derived from a (meth)acrylate monomer. The inclusion of a (meth)acrylate monomer unit in the polymer can impart flexibility to an obtained foam sheet and makes it possible to obtain a laminate sheet having good self-adhesive strength.

Examples of (meth)acrylate monomers include, but are not specifically limited to, (meth)acrylic acid alkyl ester monomers such as methyl (meth)acrylate, ethyl (meth)acrylate, n-propyl (meth)acrylate, n-butyl (meth)acrylate, sec-butyl (meth)acrylate, n-heptyl (meth)acrylate, n-hexyl (meth)acrylate, n-octyl (meth)acrylate, 2-ethylhexyl (meth)acrylate, and n-dodecyl (meth)acrylate; and (meth)acrylic acid alkoxyalkyl ester monomers such as 2-methoxyethyl (meth)acrylate, 3-methoxypropyl (meth)acrylate, 3-methoxybutyl (meth)acrylate, and ethoxymethyl (meth)acrylate.

Note that one (meth)acrylate monomer may be used individually, or two or more (meth)acrylate monomers may be used together.

The (meth)acrylate monomer is preferably a (meth) acrylic acid alkyl ester monomer from a viewpoint of further increasing flexibility of a foam sheet and even better ensuring self-adhesive strength of a laminate sheet, and is more preferably a C1-14 (meth)acrylic acid alkyl ester monomer, and even more preferably a C4-14 (meth)acrylic acid alkyl ester monomer.

Examples of C1-14 (meth)acrylic acid alkyl ester monomers include methyl acrylate, ethyl acrylate, n-propyl acrylate, n-butyl acrylate, sec-butyl acrylate, n-heptyl acrylate, n-hexyl acrylate, n-octyl acrylate, 2-ethylhexyl acrylate, methyl methacrylate, ethyl methacrylate, n-propyl methacrylate, n-butyl methacrylate, n-octyl methacrylate, and n-dodecyl methacrylate.

Examples of C4-14 (meth)acrylic acid alkyl ester monomers include n-butyl acrylate, sec-butyl acrylate, n-heptyl acrylate, n-hexyl acrylate, n-octyl acrylate, 2-ethylhexyl acrylate, n-butyl methacrylate, n-octyl methacrylate, and n-dodecyl methacrylate.

Of these monomers, n-butyl acrylate is preferable from a viewpoint of self-adhesive strength and cost.

The proportion constituted by the (meth)acrylate monomer unit in the polymer when all repeating units (all monomer units) included in the polymer are taken to be 100 mass % is preferably 35 mass % or more, more preferably 40 mass % or more, and even more preferably 45 mass % or more, and is preferably 99 mass % or less, more preferably 95 mass % or less, and even more preferably 90 mass % or less. When the proportion constituted by the (meth)acrylate monomer unit in the polymer is 35 mass % or more, self-adhesive strength of a laminate sheet can be sufficiently ensured. On the other hand, when the proportion constituted by the (meth)acrylate monomer unit in the polymer is 99 mass % or less, self-adhesive strength of a laminate sheet does not become excessively high. Consequently, formation of resin residue on metal after weathering of the laminate sheet can be further inhibited.

In addition, the proportion constituted by a C4-14 (meth) acrylic acid alkyl ester monomer unit in the polymer when all repeating units (all monomer units) included in the polymer are taken to be 100 mass % is preferably 35 mass % or more, more preferably 40 mass % or more, even more preferably 45 mass % or more, and particularly preferably 62 mass % or more, and is preferably 90 mass % or less, more preferably 85 mass % or less, and even more preferably 75 mass % or less. When the C4-14 (meth)acrylic acid alkyl ester monomer unit constitutes 35 mass % or more in the polymer, self-adhesive strength of a laminate sheet can be sufficiently ensured, and water resistance of the laminate sheet can be increased. Consequently, formation of resin residue on metal after weathering of the laminate sheet can be further inhibited. On the other hand, when the proportion constituted by the C4-14 (meth)acrylic acid alkyl ester monomer unit in the polymer is 90 mass % or less, self-adhesive strength of a laminate sheet does not become excessively high. Consequently, formation of resin residue on metal after weathering of the laminate sheet can be further inhibited.

[Alkenyl Aromatic Monomer Unit]

The alkenyl aromatic monomer unit is a structural unit that is derived from an alkenyl aromatic monomer.

Specific examples of alkenyl aromatic monomers include styrene, α-methylstyrene, α-chlorostyrene, vinyltoluene, and divinylbenzene. Of these alkenyl aromatic monomers, styrene is preferable in terms of polymerizability and cost.

Note that one alkenyl aromatic monomer may be used individually, or two or more alkenyl aromatic monomers may be used together.

The proportion constituted by the alkenyl aromatic monomer unit in the polymer when all repeating units (all monomer units) included in the polymer are taken to be 100 mass % is preferably 1 mass % or more, more preferably 5 mass % or more, even more preferably 10 mass % or more, and particularly preferably 12 mass % or more, and is preferably 50 mass % or less, more preferably 40 mass % or less, even more preferably 30 mass % or less, and particularly preferably 20 mass % or less. When the proportion constituted by the alkenyl aromatic monomer unit in the polymer is 1 mass % or more, infiltration of water into a foam sheet can be prevented based on hydrophobicity of the alkenyl aromatic monomer unit, and water resistance of a laminate sheet can be increased. Consequently, formation of resin residue on metal after weathering of the laminate sheet can be further inhibited. On the other hand, when the proportion constituted by the alkenyl aromatic monomer unit in the polymer is 50 mass % or less, flexibility of an obtained foam sheet can be sufficiently ensured, and a laminate sheet having good self-adhesive strength can be obtained.

[Other Monomer Units]

The other monomer units are structural units that are derived from other monomers that are copolymerizable with the foregoing monomers.

Examples of other monomers include conjugated diene monomers, α,β-ethylenically unsaturated polybasic carboxylic acid full ester monomers, vinyl cyanide monomers, carboxylic acid unsaturated alcohol ester monomers, olefin monomers, and monomers including other functional groups. One of these monomers may be used individually, or two or more of these monomers may be used together. Specific examples of such other monomers that can be used include those described in WO2018/151274A1, for example, but are not specifically limited thereto.

Note that the polymer preferably does not include an N-methylol group from a viewpoint of sufficiently inhibiting production of formaldehyde during foaming and curing of the composition for a foam sheet. More specifically, the polymer preferably does not include a monomer unit that includes an N-methylol group.

Examples of monomers that include an N-methylol group include N-methylolacrylamide and N-methylolmethacrylamide.

<<Production Method of Polymer>>

The polymerization method used to obtain the polymer is not specifically limited and may be any of solution polymerization, emulsion polymerization, suspension polymerization, and bulk polymerization, or may be a method other than these methods. No specific limitations are placed on the type and amount of a polymerization initiator, emulsifier, dispersant, and so forth that are used in polymerization. Moreover, no specific limitations are placed on the addition method of the monomers, polymerization initiator, emulsifier, dispersant, and so forth in polymerization. Furthermore, no limitations are placed on the polymerization temperature, pressure, stirring conditions, and so forth.

Note that although the polymer can be used in a solid form, the use of the polymer in the state of a latex containing the polymer (polymer latex), such as a latex obtained by emulsion polymerization or a latex obtained through subsequent emulsification of the polymer, facilitates operation in mixing with the cross-linker, higher fatty acid salt, and so forth, and is also convenient for causing foaming of the obtained composition for a foam sheet.

<<Properties of Polymer>>

The solubility parameter (SP value) of the polymer is preferably 9.7 $(cal/cm^3)^{1/2}$ (19.9 $(MPa)^{1/2}$) or less, more preferably 9.6 $(cal/cm^3)^{1/2}$ (19.7 $(MPa)^{1/2}$) or less, and even more preferably 9.0 $(cal/cm^3)^{1/2}$ (18.4 $(MPa)^{1/2}$) or less. When the solubility parameter of the polymer is 9.7 $(cal/cm^3)^{1/2}$ or less, it is easier to produce a laminate sheet having appropriate self-adhesive strength. Moreover, water resistance of the laminate sheet can be increased, and formation of resin residue on metal after weathering of the laminate sheet can be further inhibited.

Although no specific limitations are placed on the lower limit for the solubility parameter of the polymer, the solubility parameter is normally 8.5 $(cal/cm^3)^{1/2}$ (17.4 $(MPa)^{1/2}$) or more.

The solubility parameter of a polymer can be calculated using Hoy's group contribution method.

The glass-transition temperature of the polymer is preferably −10° C. or lower, more preferably −13° C. or lower, even more preferably −17° C. or lower, and particularly preferably −20° C. or lower. When the glass-transition temperature of the polymer is −10° C. or lower, self-adhesive strength of a laminate sheet can be sufficiently ensured while also enabling good close adherence of the laminate sheet to an adherend and thereby preventing infiltration of moisture between layers of the adherend and the laminate sheet. Consequently, formation of resin residue on metal after weathering of the laminate sheet can be further inhibited.

Although no specific limitations are placed on the lower limit for the glass-transition temperature of the polymer, the glass-transition temperature is preferably −40° C. or higher from a viewpoint of sufficiently inhibiting formation of resin residue on metal after weathering of a laminate sheet.

Note that the glass-transition temperature of a polymer can be measured using a method described in the EXAMPLES section of the present specification.

As previously mentioned, the polymer can be used in the form of a polymer latex in production of the composition for a foam sheet but is not specifically limited to being used in that form. From viewpoints such as maintaining density of an obtained foam sheet, the solid content concentration of the polymer latex is preferably 40 mass % or more, more preferably 45 mass % or more, even more preferably 50 mass % or more, and particularly preferably 52 mass % or more, and is preferably 70 mass % or less, and more preferably 58 mass % or less.

<Cross-Linker>

The cross-linker is not specifically limited so long as it can form a cross-linked structure with the previously described polymer (particularly with the unsaturated carboxylic acid monomer unit of the previously described polymer). Examples of such cross-linkers include carbodiimide cross-linkers; epoxy cross-linkers; oxazoline cross-linkers; polyfunctional isocyanate cross-linkers such as tolylene diisocyanate, trimethylolpropane tolylene diisocyanate, and diphenylmethane triisocyanate; metal salt cross-linkers; metal chelate cross-linkers; and peroxide cross-linkers. Of these cross-linkers, it is preferable to use a carbodiimide cross-linker, and, in particular, it is more preferable to use a compound including at least two carbodiimide groups in one molecule.

The carbodiimide cross-linker may be synthesized by a known technique or may be a commercially available product. Examples of commercially available products of carbodiimide cross-linkers include DICNAL® HX (DICNAL is a registered trademark in Japan, other countries, or both) produced by DIC Corporation and CARBODILITE® (CARBODILITE is a registered trademark in Japan, other countries, or both) produced by Nisshinbo Chemical Inc. In a case in which the carbodiimide cross-linker is synthesized, a polyisocyanate may be subjected to a decarboxylation condensation reaction in the presence of a carbodiimidization catalyst so as to obtain a polycarbodiimide compound as the carbodiimide cross-linker.

The carbodiimide cross-linker forms an intramolecular or intermolecular crosslinked structure in the polymer through reaction of carbodiimide groups in the carbodiimide cross-linker and unsaturated carboxylic acid monomer units in the polymer. The carbodiimide cross-linker has an excellent cross-linking effect, particularly at low temperature, and can form a foam sheet having appropriate self-adhesive strength and excellent strength. Consequently, by using a composition for a foam sheet that contains a carbodiimide cross-linker as a cross-linker, it is possible to further inhibit formation of resin residue on metal after weathering of a laminate sheet.

Note that it is preferable not to use a cross-linker that causes production of formaldehyde, such as melamine-formaldehyde resin, urea-formaldehyde resin, or phenol formaldehyde resin.

The amount of the cross-linker in the composition for a foam sheet per 100 parts by mass of the previously described polymer is preferably 0.5 parts by mass or more, more preferably 1 part by mass or more, and even more preferably 2 parts by mass or more, and is preferably 20 parts by mass or less, and more preferably 10 parts by mass or less. Through the amount of the cross-linker being within any of the ranges set forth above, it is possible to obtain a foam sheet that maintains appropriate levels of strength and elasticity. Moreover, self-adhesive strength of a laminate sheet can be ensured, and formation of resin residue on metal by the laminate sheet (particularly after weathering) can be sufficiently inhibited.

<Higher Fatty Acid Salt>

The higher fatty acid salt is a salt formed of a higher fatty acid anion having a carbon number of 8 or more and a counter cation as previously described. The higher fatty acid salt is a substance that can function as a foam stabilizer. It is presumed that as a result of the open-cell structure and water resistance of a foam sheet being improved through formation of the foam sheet by foaming and curing of a composition for a foam sheet that contains not less than a specific amount of a higher fatty acid salt relative to the previously described polymer, air releasability of a laminate sheet that includes the foam sheet can be improved, and formation of resin residue on metal after weathering of the laminate sheet can be inhibited.

Note that one higher fatty acid salt may be used individually, or two or more higher fatty acid salts may be used in combination.

The higher fatty acid anion that is a constituent of the higher fatty acid salt is derived from a higher fatty acid having a carbon number of 8 or more.

The carbon number of the higher fatty acid anion (and higher fatty acid) is required to be 8 or more as described above, is preferably 10 or more, more preferably 14 or more, and particularly preferably 16 or more, and is preferably 25 or less, and more preferably 20 or less. When the carbon number of the higher fatty acid anion is less than 8, formation of resin residue on metal after weathering of a laminate sheet cannot be inhibited. On the other hand, air releasability of a laminate sheet can be further improved through the carbon number of the higher fatty acid anion being 25 or less.

Specific examples of the higher fatty acid having a carbon number of 8 or more include caprylic acid, pelargonic acid, capric acid, undecanoic acid, lauric acid, caproleic acid, undecylenic acid, 2-ethylhexanoic acid, isononanoic acid, 3,5,5-trimethylhexanoic acid, tridecanoic acid, tetramethylnonanoic acid, myristic acid, pentadecanoic acid, palmitic acid, stearic acid, isostearic acid, 12-hydroxystearic acid, arachidic acid, behenic acid, lignoceric acid, cerotic acid, myristoleic acid, palmitoleic acid, oleic acid, elaidic acid, gondoic acid, erucic acid, selacholeic acid, linoleic acid, elaidic acid, linolenic acid, arachidonic acid, 2-hexyldecanoic acid, coconut oil fatty acids (inclusive of hydrogenated and partially hydrogenated products), palm oil fatty acids (inclusive of hydrogenated and partially hydrogenated products), palm kernel oil fatty acids (inclusive of hydrogenated and partially hydrogenated products), and tallow fatty acids (inclusive of hydrogenated and partially hydrogenated products). One of these higher fatty acids may be used individually, or two or more of these higher fatty acids may be used in combination.

The counter cation that is a constituent of the higher fatty acid salt is not specifically limited and may be an ammonium ion ($NH_4^+$), a calcium ion ($Ca^{2+}$), a potassium ion ($K^+$), a sodium ion ($Na^+$), or the like. One of these counter cations may be used individually, or two or more of these counter cations may be used in combination.

The higher fatty acid salt is preferably a stearic acid salt or a tallow fatty acid salt from a viewpoint of achieving an even better balance of improving air releasability of a laminate sheet and inhibiting formation of resin residue on metal after weathering of the laminate sheet. From a viewpoint of further improving air releasability of a laminate sheet, a stearic acid salt is more preferable, and ammonium stearate is even more preferable.

The amount of the higher fatty acid salt in the composition for a foam sheet per 100 parts by mass of the previously described polymer is required to be 1.5 parts by mass or more, is preferably 2.0 parts by mass or more, more preferably 3.0 parts by mass or more, and even more preferably 3.6 parts by mass or more, and is preferably 10.0 parts by mass or less, more preferably 7.0 parts by mass or less, and even more preferably 5.0 parts by mass or less. When the amount of the higher fatty acid salt is less than 1.5 parts by mass per 100 parts by mass of the polymer, air releasability of a laminate sheet decreases, and formation of resin residue on metal after weathering of the laminate sheet cannot be sufficiently inhibited. On the other hand, air releasability of a laminate sheet can be further improved when the amount of the higher fatty acid salt is 10.0 parts by mass or less per 100 parts by mass of the polymer.

<Solvent>

The solvent that may optionally be contained in the presently disclosed composition for a foam sheet is not specifically limited but is preferably water. In a case in which water is used as the solvent, water originating from a polymer latex can, for example, serve as the water that is contained in the composition for a foam sheet.

<Other Additives>

The presently disclosed composition for a foam sheet can optionally contain various additives in order to improve processability in production steps of a foam sheet and a laminate sheet and/or in order to improve performance of the obtained foam sheet and laminate sheet. Examples of such additives include foam stabilizers other than the previously described higher fatty acid salt (i.e., other foam stabilizers), auxiliary foaming agents, thickeners, fillers, antiseptics, fungicides, gelling agents, flame retardants, anti-aging agents, antioxidants, pigments, dyes, tackifiers, conductive compounds, water-resistant agents, and oil-resistant agents. Specific examples of the other additives described above include known additives such as those described in WO2016/147679A1, for example, without any specific limitations.

The presently disclosed composition for a foam sheet preferably contains an amphoteric surfactant as another foam stabilizer. The amphoteric surfactant is preferably a carboxylic acid amphoteric surfactant, is more preferably lauryl dimethylaminoacetic acid betaine or stearyl dimethylaminoacetic acid betaine, and is even more preferably lauryl dimethylaminoacetic acid betaine. By using a composition for a foam sheet that contains an amphoteric surfactant, self-adhesive strength of a laminate sheet does not excessively increase after weathering, and the laminate sheet can be peeled from an adherend with sufficient ease. In addition, air releasability of the laminate sheet can be further improved.

Note that one amphoteric surfactant may be used individually, or two or more amphoteric surfactants may be used in combination.

The amount of the amphoteric surfactant in the composition for a foam sheet per 100 parts by mass of the previously described polymer is preferably 0.1 parts by mass or more, more preferably 0.5 parts by mass or more, and even more preferably 0.9 parts by mass or more, and is preferably 5.0 parts by mass or less, more preferably 3.0 parts by mass or less, and even more preferably 2.0 parts by mass or less. When the amount of the amphoteric surfactant is 0.1 parts by mass or more per 100 parts by mass of the polymer, excessive increase of self-adhesive strength of a laminate sheet after weathering can be sufficiently inhibited, and air releasability of the laminate sheet can be even further improved. On the other hand, when the amount of the amphoteric surfactant is 5.0 parts by mass or less per 100 parts by mass of the polymer, water resistance of a laminate sheet is ensured, and unintended peeling of the laminate sheet from an adherend after weathering can be sufficiently prevented.

Although no specific limitations are placed on the ratio of the amount of the amphoteric surfactant and the amount of the higher fatty acid salt that are contained in the presently disclosed composition for a foam sheet, a value obtained by dividing the amount of the amphoteric surfactant by the amount of the higher fatty acid salt (i.e., amphoteric surfactant/higher fatty acid salt) is preferably 0.05 or more, more preferably 0.1 or more, even more preferably 0.2 or more, and particularly preferably 0.25 or more, and is preferably 1 or less, more preferably 0.8 or less, and even more preferably 0.5 or less. When the value of amphoteric surfactant/higher fatty acid salt is within any of the ranges set forth above, self-adhesive strength of a laminate sheet after weathering is even better controlled, and the laminate sheet can be provided with even better air releasability.

(Self-Suction Adhering Foam Laminate Sheet)

The presently disclosed laminate sheet is a sheet that includes a foam layer formed of a foam sheet obtained using the presently disclosed composition for a foam sheet set forth above and a substrate as a support layer supporting the foam layer. Note that the foam sheet may be formed directly on the substrate or may be formed on the substrate with any layer interposed in-between.

<Self-Suction Adhering Foam Sheet>

A self-suction adhering foam sheet that forms the foam layer of the presently disclosed laminate sheet is formed through cross-linking and foaming of the presently disclosed composition for a foam sheet.

The density of the self-suction adhering foam sheet is not specifically limited but is preferably not less than 0.1 g/cm$^3$ and not more than 1.0 g/cm$^3$, more preferably not less than 0.3 g/cm$^3$ and not more than 0.8 g/cm$^3$, and even more preferably not less than 0.5 g/cm$^3$ and not more than 0.7 g/cm$^3$. A foam sheet density of 0.1 g/cm$^3$ or more ensures strength of the foam sheet, whereas a foam sheet density of 1.0 g/cm$^3$ or less can sufficiently ensure air releasability of the laminate sheet while also sufficiently inhibiting formation of resin residue on metal.

Note that the density of a foam sheet can be calculated using a method described in the EXAMPLES section of the present specification.

The thickness of the foam sheet is preferably 0.03 mm or more, more preferably 0.05 mm or more, and even more preferably 0.1 mm or more, and is preferably 3 mm or less, more preferably 1 mm or less, even more preferably 0.5 mm or less, and particularly preferably 0.2 mm or less. When the thickness of the foam sheet is 0.03 mm or more, mechanical strength of the foam sheet and the laminate sheet can be sufficiently ensured. On the other hand, when the thickness of the foam sheet is 3 mm or less, a laminate sheet having excellent air releasability and repeated affixing capability (rework performance) can be obtained.

<Substrate>

The substrate of the presently disclosed laminate sheet is not specifically limited so long as it can support the foam sheet described above and may be a commonly known substrate such as a paper substrate, a synthetic paper substrate, or a plastic sheet substrate.

The thickness of the substrate is not specifically limited and can be not less than 10 μm and not more than 200 μm, for example.

<<Paper Substrate>>

The paper substrate may, for example, be woodfree paper, art paper, coated paper, kraft paper, or laminated paper obtained by laminating a thermoplastic resin such as polyethylene on any of these paper substrates.

<<Synthetic Paper Substrate>>

The synthetic paper substrate may be a sheet-shaped substrate that is obtained by combining a thermoplastic resin and an inorganic filler so as to cause paper formation in a surface layer, for example.

<<Plastic Substrate>>

The plastic substrate may, for example, be a sheet-shaped substrate formed of a polyester resin such as polyethylene terephthalate or polyethylene naphthalate; a polystyrene resin; a polyvinyl chloride resin; an acrylic resin; a polycarbonate resin; a polyamide resin; a fluororesin such as polytetrafluoroethylene; or a mixture or laminate of any of these resins.

<Production Method of Self-Suction Adhering Foam Laminate Sheet>

The following describes one example of a method of producing the presently disclosed laminate sheet.

FIG. 1 illustrates a flowchart for description of one example of a method S10 of producing the laminate sheet (hereinafter, also referred to simply as "production method S10"). As illustrated in FIG. 1, the production method S10 includes a composition production step S1, a foaming step S2, and a sheet forming step S3 in this order. These steps are described below.

<<Composition Production Step S1>>

The composition production step S1 is a step of producing the composition for a self-suction adhering foam sheet.

More specifically, the composition for a foam sheet can be produced in the composition production step S1 by mixing the specific polymer, the cross-linker, and the higher fatty acid salt that are essential components with a solvent and other additives that are used as desired by any mixing method.

For example, in a case in which a polymer latex is used in production of the composition for a foam sheet, the cross-linker, the higher fatty acid salt, and other additives that are optionally used may be added to the polymer latex and then mixed therewith by a known method.

Note that in a case in which a solid polymer is used and a solvent is not used in production of the composition for a foam sheet, the solid polymer, the cross-linker, the higher fatty acid salt, and other additives that are optionally used may be mixed by a known method (for example, using a known roll, Henschel mixer, kneader, or the like).

The viscosity of a composition for a foam sheet that contains a solvent (for example, taking the form of an emulsion or a dispersion) is preferably not less than 1,000 mPa·s and not more than 10,000 mPa·s, more preferably not less than 2,000 mPa·s and not more than 10,000 mPa·s, and more preferably not less than 3,500 mPa·s and not more than 5,500 mPa·s. When the viscosity of the composition for a foam sheet is 1,000 mPa·s or more, it is possible to prevent liquid dripping from occurring and thickness control from becoming difficult when a foam formed from the composition for a foam sheet is coated onto a substrate and a foam sheet is formed. On the other hand, when the viscosity of the composition for a foam sheet is 10,000 mPa·s or less, it does not become difficult to control the foaming ratio through mechanical foaming during formation of the foam sheet.

Note that the viscosity of a composition for a foam sheet can be measured by a method described in the EXAMPLES section of the present specification.

<<Foaming Step S2>>

The foaming step S2 is a step of foaming the composition for a foam sheet to obtain a foam of the composition for a foam sheet.

More specifically, a foam in an unsolidified (uncross-linked) state can be obtained in the foaming step S2 by foaming the composition for a foam sheet that has been produced in the composition production step S1. In a case in which the composition for a foam sheet is in the form of an emulsion or a dispersion, a foam emulsion or a foam dispersion is obtained.

Mechanical foaming is typically adopted as the method of foaming. The foaming ratio is adjusted as appropriate and is normally not less than 1.2 times and not more than 5 times, and preferably not less than 1.5 times and not more than 4 times. The method of mechanical foaming is not specifically limited. For example, mechanical foaming can be carried out by mixing a certain amount of air into an emulsion or dispersion of the composition for a foam sheet and stirring the mixture in a continuous or batch manner using an Oakes mixer, a whipper, or the like. The resultant foam emulsion or foam dispersion is creamy.

The formation of fine pores through this mechanical foaming makes it possible to obtain a foam sheet having excellent air releasability through the subsequently described sheet forming step S3. Note that reduction of air releasability can be prevented through the foaming ratio being 1.2 times or more, whereas reduction of strength of the foam sheet can be prevented through the foaming ratio being 5 times or less.

<<Sheet Forming Step S3>>

The sheet forming step S3 is a step of shaping the foam into the form of a sheet and subsequently performing a cross-linking reaction of the foam to produce a foam sheet.

No specific limitations are placed on the method by which the foam produced in the foaming step S2 is shaped into the form of a sheet in the sheet forming step S3. One example of a suitable method is a method in which the foam is coated onto a desired substrate and is shaped into the form of a sheet. By coating the foam onto a desired substrate in this manner and causing a cross-linking reaction to proceed, it is possible to obtain a laminate sheet in which a foam sheet is directly disposed on a substrate.

Note that coating of the foam can be performed onto a releasable sheet (process paper that is releasable, or the like) instead of the substrate. By coating the foam onto a releasable sheet and causing a cross-linking reaction to proceed, it is possible to obtain a laminate in which a foam sheet is directly disposed on a releasable sheet. The releasable sheet can then be peeled from the foam sheet of the laminate so as to obtain just the foam sheet (as an independent film).

The method by which the foam is coated onto the substrate or releasable sheet (hereinafter, also referred to collectively as the "substrate or the like") can be a method using a generally known coating device such as an applicator, a bar coater, a roll coater, a reverse roll coater, a screen coater, a doctor knife coater, or a comma knife coater.

The method by which the foam coated as a sheet onto the substrate or the like is cross-linked is preferably a method in which the foam is dried under heating. The method of drying under heating is not specifically limited so long as it is a method that enables drying and cross-linking of the foam that has been coated onto the substrate or the like, and may be a method using a known drying furnace (for example, a hot air circulation oven, a hot oil circulation hot air chamber, or a far infrared heater chamber). The drying temperature can be not lower than 60° C. and not higher than 180° C., for example. Rather than performing drying at a constant temperature, it is preferable to perform multi-stage drying such that the foam is initially dried from the inside at a low temperature and is later dried sufficiently at a higher temperature.

Note that properties of the foam sheet (density, thickness, hardness, etc.) can be adjusted by, for example, altering the mixing ratio of air bubbles and the chemical composition, solid content concentration, and drying and cross-linking conditions of the composition for a foam sheet.

The laminate sheet obtained through steps S1 to S3 described above may, for example, be wound up by a winding machine and be processed to an easy to use size through cutting by press-cutting, slitting, or the like after a separator film has been affixed to a surface of the laminate sheet that displays self-suction adhesion (i.e., the surface at the foam sheet-side), but this is not a specific limitation.

<Application of Laminate Sheet>

The substrate surface of the presently disclosed laminate sheet can be subjected to printing by offset printing, seal printing, flexographic printing, silkscreen printing, gravure printing, printing with a laser printer, thermal transfer printer, or inkjet printer, or the like.

The laminate sheet that has undergone printing at the substrate surface thereof can advantageously be used in outdoor applications such as for sales promotion cards, so-called "POP cards" (posters, stickers, displays, etc.), POPs for gardening (plant labels, etc.), road signs (for funerals, housing exhibitions, etc.), and display boards (indicating that entry is not permitted, that work is being carried out on forest roads, etc.).

EXAMPLES

The following provides a more detailed description of the present disclosure through examples. However, the present disclosure is not limited to these examples. Note that "parts" and "%" in the following description are by mass, unless otherwise specified.

Also note that the following methods were used in the examples and comparative examples to measure or evaluate the solubility parameter and glass-transition temperature of a polymer, the viscosity of a composition for a foam sheet, the density of a foam sheet, and the air releasability, self-adhesive strength (initial and after weathering) to glass, self-adhesive strength (initial and after weathering) to SUS, formation of resin residue on glass after weathering, and formation of resin residue on SUS after weathering of a laminate sheet.

<Solubility Parameter of Polymer>

The solubility parameter (SP value) of a polymer was calculated using Hoy's group contribution method.

<Glass-Transition Temperature of Polymer>

A polymer latex was applied onto a polyethylene terephthalate film of 50 μm in thickness by a 250 μm applicator and was dried at normal temperature for 24 hours to obtain a film formed on the polyethylene terephthalate film. The film formed on the polyethylene terephthalate film (i.e., the film other than the polyethylene terephthalate film) was used as a sample to perform measurement of glass-transition temperature (° C.) in accordance with JIS K 7121 under conditions of a measurement temperature of −50° C. to 160° C. and a heating rate of 10° C./min using a differential scanning calorimeter (DSC7000X produced by Hitachi High-Tech Science Corporation).

<Viscosity of Composition for Foam Sheet>

The viscosity of a composition for a foam sheet at 23° C. was measured using a B-type viscometer (VISCOTESTER VT-06 produced by RION Co., Ltd.).

<Density of Foam Sheet>

After a laminate sheet had been produced, the sheet was cut out as 20 cm×20 cm in size to prepare a test specimen. The mass X g of the cut-out test specimen was precisely weighed. In addition, the mass Y g of a substrate cut out as 20 cm×20 cm was precisely weighed. Thereafter, the thicknesses of the produced laminate sheet and the substrate were each measured by a thickness meter, and the thickness of the substrate was subtracted from the thickness of the laminate sheet to determine the thickness T cm of a foam sheet. Note that a value for thickness was calculated as an average value of measurements made at 5 points. The density of the foam sheet was then calculated by substituting the measured values for X, Y, and T into the following equation.

Density (g/cm$^3$)=(X−Y)/(T×20×20)

<Air Releasability of Laminate Sheet>
<<Evaluation Apparatus>>

Figure 2:
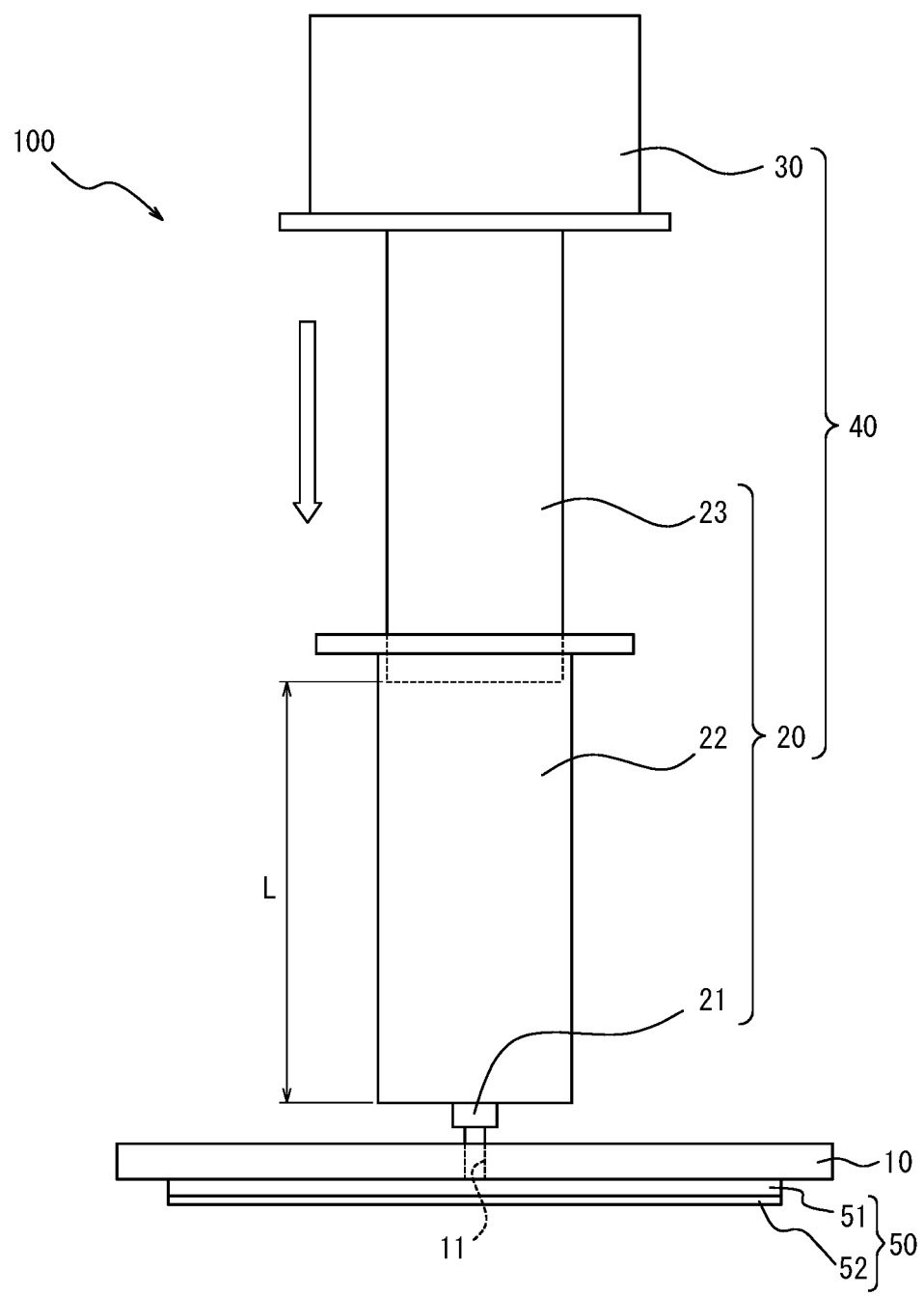
FIG. 2 is an explanatory diagram illustrating schematic configuration of an evaluation apparatus used in evaluation of air releasability of a self-suction adhering foam laminate sheet in examples and comparative examples.

Evaluation of air releasability was performed using an evaluation apparatus 100 illustrated in FIG. 2. The evaluation apparatus 100 illustrated in FIG. 2 is an apparatus that evaluates air releasability of a laminate sheet 50 in which a foam sheet 51 and a substrate 52 are stacked. The evaluation apparatus 100 includes a sample fixing plate 10 including a through hole 11 and a gas pumping mechanism 40 that pumps air with a constant pressure as a gas to one surface side (lower side in FIG. 2) of the sample fixing plate 10 from the other surface side (upper side in FIG. 2) of the sample fixing plate 10, via the through hole 11.

The gas pumping mechanism 40 includes a syringe 20, the front end of which is connected to the through hole 11 of the sample fixing plate 10 at the other surface side of the sample fixing plate 10, and also includes a weight 30. The syringe 20 is connected to the sample fixing plate 10 with the front end oriented in a vertically downward direction (downward in FIG. 2) and includes a needle 21 that is inserted into and fixed in the through hole 11 of the sample fixing plate 10, a circular tube-shaped barrel 22 that is connected to the through hole 11 at a front end thereof (lower end in FIG. 2) via the needle 21, and a piston 23 that is inserted into the barrel 22 from a rear end of the barrel 22.

The weight 30 is attached onto a flange disposed at a rear end (upper end in FIG. 2) of the piston 23.

In the gas pumping mechanism 40 having the configuration described above, the piston 23 is pushed into the barrel 22 under the weight of the piston 23 and the weight 30 such that air inside the barrel 22 is pumped with a constant pressure to the one surface side (foam sheet 51) of the sample fixing plate 10, via the needle 21 and the through hole 11.

Moreover, in the evaluation apparatus 100 having the configuration described above, air releasability of the laminate sheet 50 can be evaluated by, for example, affixing the laminate sheet 50 to one surface of the sample fixing plate 10 at an opposite side thereof to the side where the needle 21 is fixed such that the laminate sheet 50 covers the through hole 11 (step (A)), subsequently connecting the barrel 22 to the needle 21 after the piston 23 with the weight 30 attached thereto has been inserted into the barrel 22 up to a position at a distance L from the front end, and then measuring the time required for the piston 23 to proceed the distance L under the weight of the piston 23 and the weight 30 (step (B)). In other words, since air inside the barrel 22 is pushed out from the through hole 11 with a constant pressure under the weight of the piston 23 and the weight 30, setting the distance L as a constant and the amount of air that is pushed out from the barrel 22 as a constant results in the time taken to proceed the distance L being longer for a laminate sheet 50 having lower air releasability and shorter for a laminate sheet 50 having higher air releasability. Accordingly, air releasability of the laminate sheet 50 can be quantitively evaluated through the time required for the piston 23 to proceed the distance L. Since evaluation can be performed under conditions in which the amount and pressure of pumped air are constant, air releasability can be evaluated with high repeatability. Moreover, since the laminate sheet 50 is evaluated in an affixed state with the sample fixing plate 10, air releasability of the laminate sheet 50 while in an affixed state with an adherend can be accurately evaluated.

Note that a transparent polycarbonate plate (50 mm×50 mm) of 1 mm in thickness was used as the sample fixing plate 10, a glass syringe of 2 mL in capacity that included a metal syringe needle of 2 mm in diameter was used as the syringe 20, and a weight weighing 30 g was attached to the piston 23 by double-sided tape as the weight 30.

<<Evaluation Procedure>>

After a laminate sheet had been produced, the laminate sheet was cut to a size of 40 mm×40 mm to obtain a sample as an evaluation subject.

The surface at the foam sheet-side of the prepared sample was affixed to one surface of the sample fixing plate 10 at the opposite side thereof to the side where the needle 21 was fixed such as to cover the through hole 11 and such that air did not enter (step (A)). The barrel 22 was subsequently connected to the needle 21 after the piston 23 with the weight 30 attached thereto had been inserted into the barrel 22 up to a position corresponding to a marking for 2 mL. Thereafter, the weight 30 and the piston 23 that were being held by hand were released therefrom, and the time required for complete dropping of the piston 23 and the weight 30 under their own weight (i.e., until 2 mL of air was pumped) was measured (step (B)). This measurement operation was repeated three times, and an average value of the measured times was calculated. A smaller value indicates that the laminate sheet has better air releasability.

<Self-Adhesive Strength (Initial) of Laminate Sheet to Glass>

After a laminate sheet had been produced, the sheet was cut out as 125 mm×25 mm in size to prepare a test specimen. The surface at the foam sheet-side of the test specimen was affixed to a glass plate having a smooth surface, was compression bonded by a 2 kgf load roller from above the test specimen, and was then left in an environment of 23° C. and 50% RH for 1 hour. Thereafter, an edge of the test specimen was fixed to an upper chuck of an Autograph (AG-IS produced by Shimadzu Corporation), the glass plate was fixed to a lower chuck of the Autograph, and a 180° peeling test was performed at a rate of 300 mm/min in an environment of 23° C. and 50% RH. The test strength (N/cm) at this time was taken to be the self-adhesive strength (initial) to glass.

<Self-Adhesive Strength (after Weathering) of Laminate Sheet to Glass>

After a laminate sheet had been produced, the sheet was cut out as 125 mm×25 mm in size to prepare a test specimen. The surface at the foam sheet-side of the test specimen was affixed to a glass plate having a smooth surface and was compression bonded by a 2 kgf load roller from above the test specimen. The glass plate with the test specimen affixed thereto was subsequently attached to a test specimen holder. A Sunshine Super Long-life Weather Meter (WEL-SUN-HC B model produced by Suga Test Instruments Co., Ltd.) including a sunshine carbon arc (ultra-long-life carbon: 4 pairs) light source was set to a discharge voltage of 50 V and discharge current of 60 A, and the surface of the test specimen was irradiated with light while being sprayed with water (simulated rainfall) so as to perform accelerated weathering for 500 hours with a black panel temperature of 63° C. The surface spraying (simulated rainfall) time was set as 18 minutes/2 hours (i.e., repeated cycles of 18 minutes with surface spraying and 102 minutes without surface spraying). The test specimen that had undergone accelerated weathering was left for 1 day in an environment of 23° C. and 50% RH while in an affixed state with the glass plate. Thereafter, an edge of the test specimen was fixed to an upper chuck of an Autograph (AG-IS produced by Shimadzu Corporation), the glass plate was fixed to a lower chuck of the Autograph, and a 180° peeling test was performed at a rate of 300 mm/min in an environment of 23° C. and 50% RH. The test strength (N/cm) at this time was taken to be the self-adhesive strength (after weathering) to glass.

<Self-Adhesive Strength (Initial) of Laminate Sheet to SUS>

The self-adhesive strength (initial) to SUS was measured by performing the same operations as for the self-adhesive strength (initial) of a laminate sheet to glass with the exception that an SUS plate (SUS304 BA; same below) was used instead of a glass plate.

<Self-Adhesive Strength (after Weathering) of Laminate Sheet to SUS>

The self-adhesive strength (after weathering) to SUS was measured by performing the same operations as for the self-adhesive strength (after weathering) of a laminate sheet to glass with the exception that an SUS plate was used instead of a glass plate.

<Formation of Resin Residue on Glass after Weathering>

Once self-adhesive strength (after weathering) of a laminate sheet to glass had been measured, the glass plate (i.e., the glass plate after the laminate sheet had been peeled off) was visually checked to determine whether some of the foam sheet (i.e., resin) remained at the surface thereof, and an evaluation was made by the following standard.

A: Resin residue not observed at glass plate surface
B: Resin residue observed at glass plate surface <Formation of Resin Residue on SUS after Weathering>

Once self-adhesive strength (after weathering) of a laminate sheet to SUS had been measured, the SUS plate (i.e., the SUS plate after the laminate sheet had been peeled off) was visually checked to determine whether some of the foam sheet (i.e., resin) remained at the surface thereof, and an evaluation was made by the following standard.

A: Resin residue not observed at SUS plate surface
B: Resin residue observed at SUS plate surface Example 1

<Production of Polymer>

A monomer emulsion was obtained by mixing and stirring 29.0 parts of deionized water, a monomer mixture containing 70 parts of n-butyl acrylate and 14 parts of methyl methacrylate as (meth)acrylate monomers, 14 parts of styrene as an alkenyl aromatic monomer, and 2 parts of itaconic acid as an unsaturated carboxylic acid monomer, 0.4 parts of sodium dodecylbenzenesulfonate (NEOPELEX® G15 (NEOPELEX is a registered trademark in Japan, other countries, or both) produced by Kao Corporation), and 0.5 parts of polyoxyethylene lauryl ether (EMULGEN® 120 (EMULGEN is a registered trademark in Japan, other countries, or both) produced by Kao Corporation).

Next, separately from the above, a glass reactor including a reflux condenser, a dropping funnel, a thermometer, a nitrogen blowing port, and a stirrer was prepared, this glass reactor was charged with 43.0 parts of deionized water, 0.04 parts of sodium dodecylbenzenesulfonate (NEOPELEX G15 produced by Kao Corporation), and 0.06 parts of polyoxyethylene lauryl ether (EMULGEN 120 produced by Kao Corporation), and these materials were heated to a temperature of 80° C. under stirring. In a state in which a temperature of 80° C. was maintained, 0.3 parts of ammonium persulfate dissolved in 5.7 parts of deionized water was added, and then the monomer emulsion obtained as described above was gradually added over 4 hours. Once this addition was complete, stirring was continued for a further 4 hours, and then cooling was performed to quench the reaction to yield a reaction mixture. The polymerization conversion rate at this point was almost 100% (98% or more). The obtained reaction mixture was adjusted to pH 5.5 with 25% ammonia water to obtain a polymer latex having a solid content concentration of 55%. The glass-transition temperature of a polymer contained in the obtained polymer latex was −25° C. The SP value of the polymer contained in the polymer latex was 9.6 $(cal/cm^3)^{1/2}$.

<Production of Composition for Foam Sheet>

A mixing vessel was charged with 100 parts in terms of solid content of the polymer latex (i.e., 100 parts of the polymer contained in the polymer latex), 2.2 parts in terms of solid content of a carbodiimide cross-linker (cross-linker; CARBODILITE E-02 produced by Nisshinbo Chemical Inc.), and 4.2 parts in terms of solid content of a titanium oxide water dispersion (pigment; DISPERSE WHITE HG-701 produced by DIC Corporation), and was stirred by a disper blade. Next, the stirring was continued while 1.6 parts in terms of solid content of an acrylic polymer (thickener; ARON® B-300K (ARON is a registered trademark in Japan, other countries, or both) produced by Toagosei Co., Ltd.) and 3.6 parts in terms of solid content of ammonium stearate (foam stabilizer; Nopco® DC-100-A (Nopco is a registered trademark in Japan, other countries, or both) produced by San Nopco Limited) were added in order, and then filtration was performed using a 150 mesh. Finally, ammonia was added to adjust the viscosity to 4,500 mPa·s and yield a composition for a foam sheet.

<Production of Laminate Sheet>

The composition for a foam sheet obtained as described above was whisked to a foaming rate of 1.6 times through stirring using a whisk and was then further stirred for 5 minutes at a reduced stirring speed.

The foamed composition for a foam sheet (foam) was coated onto a substrate (sheet-shaped substrate of 50 μm in thickness formed of polyethylene terephthalate) using a 0.3 mm applicator. The resultant product was loaded into a drying furnace and was held at 80° C. for 1.33 minutes, at 120° C. for 1.33 minutes, and at 140° C. for 1.33 minutes so as to perform drying and cross-linking to thereby obtain a laminate sheet including a foam sheet on the substrate. Note that the thickness of the foam sheet after drying was 0.133 mm. The obtained laminate sheet was used to perform various evaluations. The results are shown in Table 1.

Example 2

A polymer, a composition for a foam sheet, and a laminate sheet were produced, and various evaluations were performed in the same way as in Example 1 with the exception that in production of the composition for a foam sheet, 7.3 parts in terms of solid content of an epoxy cross-linker (RIKABOND® EX-8 (RIKABOND is a registered trademark in Japan, other countries, or both) produced by Japan Coating Resin Co., Ltd.) was used instead of 2.2 parts in terms of solid content of a carbodiimide cross-linker, and 3.6 parts in terms of solid content of potassium soap of partially hydrogenated tallow fatty acid (KS Soap produced by Kao Corporation) was used instead of 3.6 parts in terms of solid content of ammonium stearate. The results are shown in Table 1.

Example 3

A polymer, a composition for a foam sheet, and a laminate sheet were produced, and various evaluations were performed in the same way as in Example 1 with the exception that in production of the composition for a foam sheet, 0.9 parts in terms of solid content of lauryl dimethylaminoacetic acid betaine (AMOGEN® SH (AMOGEN is a registered trademark in Japan, other countries, or both) produced by DKS Co., Ltd.) was added at the same time as ammonium stearate. The results are shown in Table 1.

Comparative Example 1

A polymer, a composition for a foam sheet, and a laminate sheet were produced, and various evaluations were performed in the same way as in Example 1 with the exception that in production of the composition for a foam sheet, 2.2 parts in terms of solid content of an alkyl betaine amphoteric compound/fatty acid alkanolamide mixture (DICNAL M-20 produced by DIC Corporation) and 1.9 parts in terms of solid content of a sulfonic acid anionic surfactant (DICNAL M-40 produced by DIC Corporation) were used instead of 3.6 parts in terms of solid content of ammonium stearate. The results are shown in Table 1.

Comparative Example 2

A polymer, a composition for a foam sheet, and a laminate sheet were produced, and various evaluations were performed in the same way as in Example 1 with the exception that in production of the composition for a foam sheet, the used amount of ammonium stearate was changed to 1.2 parts in terms of solid content. The results are shown in Table 1.

TABLE 1

| | | | Example 1 | Example 2 | Example 3 | Comparative Example 1 | Comparative Example 2 |
|---|---|---|---|---|---|---|---|
| Composition for foam sheet | | Polymer [parts by mass] | 100 | 100 | 100 | 100 | 100 |
| | Cross-linker | Carbodiimide cross-linker [parts by mass] | 2.2 | — | 2.2 | 2.2 | 2.2 |
| | | Epoxy cross-linker [parts by mass] | — | 7.3 | — | — | — |
| | Higher fatty acid salt | Ammonium stearate [parts by mass] | 3.6 | — | 3.6 | — | 1.2 |
| | | Potassium soap of partially hydrogenated tallow fatty acid [parts by mass] | — | 3.6 | — | — | — |
| | Other foam stabilizers | Alkyl betaine amphoteric compound/fatty acid alkanolamide mixture [parts by mass] | — | — | — | 2.2 | — |
| | | Sulfonic acid anionic surfactant [parts by mass] | — | — | — | 1.9 | — |
| | | Lauryl dimethylaminoacetic acid betaine [parts by mass] | — | — | 0.9 | — | — |
| Laminate sheet | | Density of foam sheet [g/cm$^3$] | 0.65 | 0.58 | 0.59 | 0.64 | 0.66 |
| | | Air releasability [s] | 4.0 | 8.0 | 1.5 | 24.9 | 86.8 |
| | Self-adhesive strength | On glass Initial [N/cm] | 2.8 | 0.2 | 1.0 | 0.6 | 3.0 |
| | | After weathering [N/cm] | 6.7 | 3.8 | 4.4 | 1.1 | 10.0 |
| | | On SUS Initial [N/cm] | 2.4 | 0.2 | 0.9 | 0.7 | 2.5 |
| | | After weathering [N/cm] | 8.7 | 1.1 | 5.7 | 6.2 | 8.0 |
| | Resin residue | On glass After weathering | A | A | A | A | A |
| | | On SUS After weathering | A | A | A | B | A |

It can be seen from Table 1 that in Examples 1 to 3 in which the used composition for a foam sheet contained a specific polymer, a cross-linker, and a higher fatty acid salt and in which the amount of the higher fatty acid salt was not less than a specific value, a laminate sheet that had excellent air releasability and inhibited formation of resin residue on metal even after weathering was obtained.

In contrast, it can be seen that air releasability of a laminate sheet decreased and formation of resin residue on metal after weathering could not be sufficiently inhibited in Comparative Example 1 in which the used composition for a foam sheet did not contain a higher fatty acid salt.

It can also be seen that air releasability of a laminate sheet decreased in Comparative Example 2 in which the used composition for a foam sheet contained a higher fatty acid salt but in which the amount of this higher fatty acid salt was less than the specific value.

INDUSTRIAL APPLICABILITY

According to the present disclosure, it is possible to provide a self-suction adhering foam laminate sheet that has excellent air releasability while also inhibiting formation of resin residue on metal after weathering and also to provide a composition for a self-suction adhering foam sheet that can be used to obtain this self-suction adhering foam laminate sheet.

REFERENCE SIGNS LIST

S1 composition production step
S2 foaming step
S3 sheet forming step
S10 method of producing laminate sheet
10 sample fixing plate
11 through hole
20 syringe
21 needle
22 barrel
23 piston
30 weight
40 gas pumping mechanism
50 laminate sheet
51 foam sheet
52 substrate
100 evaluation apparatus

The invention claimed is:

1. A composition for a self-suction adhering foam sheet comprising:
a polymer including an unsaturated carboxylic acid monomer unit in a proportion of not less than 0.1 mass % and not more than 20 mass %;
a cross-linker; and
1.5 parts by mass or more of a higher fatty acid salt per 100 parts by mass of the polymer, wherein
the polymer includes an alkenyl aromatic monomer unit and does not include an N-methylol group, and
the higher fatty acid salt is a salt formed of a higher fatty acid anion having a carbon number of 8 or more and a counter cation.

2. The composition for a self-suction adhering foam sheet according to claim 1, wherein the cross-linker is a carbodiimide cross-linker.

3. The composition for a self-suction adhering foam sheet according to claim 1, wherein the polymer further includes a (meth)acrylate monomer unit in a proportion of not less than 35 mass % and not more than 99 mass %.

4. The composition for a self-suction adhering foam sheet according to claim 3, wherein the (meth)acrylate monomer unit includes a (meth)acrylic acid alkyl ester monomer unit having an alkyl group carbon number of not less than 1 and not more than 14.

5. The composition for a self-suction adhering foam sheet according to claim 3, wherein the (meth)acrylate monomer unit includes a (meth)acrylic acid alkyl ester monomer unit having an alkyl group carbon number of not less than 4 and not more than 14.

6. The composition for a self-suction adhering foam sheet according to claim 1, further comprising an amphoteric surfactant.

7. The composition for a self-suction adhering foam sheet according to claim 1, wherein the higher fatty acid salt is a stearic acid salt.

8. A self-suction adhering foam laminate sheet comprising: a substrate; and a self-suction adhering foam sheet formed using the composition for a self-suction adhering foam sheet according to claim 1.

9. The composition for a self-suction adhering foam sheet according to claim 1, wherein the higher fatty acid salt is selected from a stearic acid salt and a tallow fatty acid salt.

10. The composition for a self-suction adhering foam sheet according to claim 1 further comprising an amphoteric surfactant,
wherein a value obtained by dividing a mass amount of the amphoteric surfactant by a mass amount of the higher fatty acid salt is 0.05 or more and 1 or less.

11. The composition for a self-suction adhering foam sheet according to claim 1, wherein the amount of the higher fatty acid salt per 100 parts by mass of the polymer is 1.5 parts by mass or more and 3.6 parts by mass or less.

12. The composition for a self-suction adhering foam sheet according to claim 1 further comprising an amphoteric surfactant,
wherein a value obtained by dividing a mass amount of the amphoteric surfactant by a mass amount of the higher fatty acid salt is 0.05 or more and 0.8 or less.

13. The composition for a self-suction adhering foam sheet according to claim 1 further comprising an amphoteric surfactant,
wherein a value obtained by dividing a mass amount of the amphoteric surfactant by a mass amount of the higher fatty acid salt is 0.05 or more and 0.5 or less.

* * * * *